(12) United States Patent
Sun et al.

(10) Patent No.: US 11,852,136 B2
(45) Date of Patent: Dec. 26, 2023

(54) TOGGLE-TYPE OPEN-CLOSE CLAMPING STRUCTURAL ASSEMBLY AND PUMP HEAD OF PERISTALTIC PUMP

(71) Applicant: BAODING SHENCHEN PRECISION PUMP CO., LTD., Hebei (CN)

(72) Inventors: Wei Sun, Hebei (CN); Xiaopeng Cao, Hebei (CN)

(73) Assignee: BAODING SHENCHEN PRECISION PUMP CO., LTD, Hebei (CN)

( * ) Notice: Subject to any disclaimer, the term of this patent is extended or adjusted under 35 U.S.C. 154(b) by 0 days.

(21) Appl. No.: 17/626,912

(22) PCT Filed: Jun. 9, 2020

(86) PCT No.: PCT/CN2020/095115
§ 371 (c)(1),
(2) Date: Jan. 13, 2022

(87) PCT Pub. No.: WO2021/057090
PCT Pub. Date: Apr. 1, 2021

(65) Prior Publication Data
US 2022/0282727 A1    Sep. 8, 2022

(30) Foreign Application Priority Data
Sep. 29, 2019    (CN) .................. 201910933057.X

(51) Int. Cl.
*F04B 53/22* (2006.01)
*F04B 43/12* (2006.01)

(52) U.S. Cl.
CPC .............. *F04B 53/22* (2013.01); *F04B 43/12* (2013.01)

(58) Field of Classification Search
CPC ...... F04B 53/22; F04B 43/12; F04B 43/1253; F04B 43/1276; F16L 33/2073
See application file for complete search history.

(56) References Cited

U.S. PATENT DOCUMENTS 3,353,491 A * 11/1967 Bastian ............... F04B 43/1284
417/477.9
2016/0377961 A1   12/2016 Hyers et al.
2017/0306944 A1   10/2017 Hays et al.

FOREIGN PATENT DOCUMENTS

CN      201723422 U    1/2011
CN      203036140 U    7/2013
(Continued)

OTHER PUBLICATIONS

International Search Report from corresponding PCT/CN2020/095115 dated Sep. 11, 2020.

*Primary Examiner* — Nathan C Zollinger
(74) *Attorney, Agent, or Firm* — Caesar Rivise, PC

(57) ABSTRACT

A toggle-type open-close clamping structural assembly and a pump head of a peristaltic pump comprising same. The toggle-type open-close clamping structural assembly comprises: a lower pipe clamp and an upper pipe clamp (1) that are oppositely arranged and that are used to form a pair of hose clamp hoops; an upper pressure block used for lifting and lowering to open and close; and a driving lever (4) used for enabling the upper pipe clamp (1) to follow the upper pressure block to lift, slip and follow-up. The driving lever (4) is pivotally connected to the upper pressure block. The upper pipe clamp (1) and one end of the driving lever (4) are overlappingly disposed in a clamping port reserved on the upper pressure block, and the other end of the driving lever (4) is abutted against a fixing part (5) that serves as fixing reference. In the lifting process of the upper pressure block, the upper pipe clamp (1) is driven to lift, and meanwhile, the driving lever (4) follows up and rises and lifts up the upper pipe clamp (1), so that the upper pipe clamp (1) is far away from the lower pipe clamp, thereby preventing the driving lever (4) from wear and tear and achieving simple and efficient replacement of hoses.

12 Claims, 4 Drawing Sheets

(56) References Cited

FOREIGN PATENT DOCUMENTS

| | | | | | |
|---|---|---|---|---|---|
| CN | 105201795 | A | | 12/2015 | |
| CN | 109707603 | A | | 5/2019 | |
| CN | 110645166 | A | | 1/2020 | |
| GB | 1344825 | A | * | 1/1974 | |
| GB | 2525887 | A | * | 11/2015 | .............. F04B 43/12 |
| GB | 2570320 | A | * | 7/2019 | .............. F04B 43/12 |
| JP | H1061828 | A | | 3/1998 | |

* cited by examiner

TOGGLE-TYPE OPEN-CLOSE CLAMPING STRUCTURAL ASSEMBLY AND PUMP HEAD OF PERISTALTIC PUMP

CROSS-REFERENCE TO RELATED APPLICATIONS

This application is a U.S. National Phase Application of PCT/CN2020/095115, filed Jun. 9, 2020, which claims priority to CN 201910933057.X, filed Sep. 29, 2019, the contents of which applications are incorporated herein by reference in their entireties for all purposes.

FIELD OF THE INVENTION

The present invention relates to a field of peristaltic pump mechanisms, and is particularly suitable for a toggle-type open-close clamping structural assembly and a pump head of a peristaltic pump.

BACKGROUND OF THE INVENTION

A peristaltic pump is a special positive displacement pump, mainly used in the distribution or transportation of fluids, and widely used in pharmaceutical, food, chemical and other industries. When the pump head of the peristaltic pump is working, the rollers rotate, and a "pillow"-shaped fluid is formed in a section of pump tube between two rollers, and the fluid is pumped by alternately squeezing and releasing the elastic delivery tube of the pump. The tube is a consumable and needs to be replaced regularly.

In the design of the pump head of the existing peristaltic pump, the upper tube clamp is generally fixed on the upper pressing block and moves up and down with the upper pressing block, and there is no relative displacement between the upper tube clamp and the upper pressing block. The upper pressing block is driven to move up and down by an eccentric shaft mechanism in the pump head of the peristaltic pump, and an eccentricity of an eccentric wheel in the eccentric shaft mechanism is an up and down movement displacement of the upper pressing block and the upper tube clamp. When replacing the tube for the pump head of the peristaltic pump, since the upper pressing block and the upper tube clamp are fixed as a whole, a relative displacement between the upper tube clamp and the lower tube clamp is fixed, and a relative displacement between the upper tube clamp and a lower support is fixed (the relative displacement is equal to the eccentricity of the eccentric wheel). The eccentricity is twice the distance between a center of a connecting shaft installation hole of the eccentric wheel and a center of the eccentric wheel.

Due to the limitation of an overall size of the pump head of the peristaltic pump, the size of the eccentric wheel is also limited, so a lifting height of the upper pressing block is limited, resulting in narrow spaces between the upper tube clamp and the lower tube clamp and between the upper tube clamp and the lower support. When replacing the tube, it is necessary to manually lift the upper tube clamp or depress the lower tube clamp after lifting the upper pressing block, which is very inconvenient to operate, especially for large-diameter tubes.

SUMMARY OF THE INVENTION

Purpose of the present invention is that the present invention provides an eccentric liquid feeding mechanism aiming at the problem of uncontrollable tube damage when the tube is installed in the existing peristaltic pump liquid transfer mechanism and the problem of cumbersome and frequent tube replacement steps.

The problem to be solved by the present invention is realized by the following technical scheme:

A toggle-type open-close clamping structural assembly, includes a lower tube clamp and an upper tube clamp that are oppositely arranged to form a pair of collars for clamping a tube, an upper pressing block used for lifting and lowering to open and close, and further includes: a driving lever used for enabling the upper tube clamp to lift or lower slidably with the upper pressing block.

The driving lever is pivotally connected to the upper pressing block, the upper tube clamp and one end of the driving lever are overlappingly disposed in a groove reserved in the upper pressing block, and the other end of the driving lever is abutted against a fixed part serving as fixing reference, and in a lifting process of the upper pressing block, the upper tube clamp is driven to lift and lower, and meanwhile, the driving lever rises together with the upper pressing block and lifts up the upper tube clamp, to cause the upper tube clamp far away from the lower tube clamp.

Further, the fixed part is disposed on a body, the body slides along the upper pressing block, and a lower edge of the fixed part has a sliding surface for sliding of the driving lever, and in the lifting process of the upper pressing block, the other end of the driving lever slides along the sliding surface, and meanwhile the one end of the driving lever lifts the upper tube clamp.

Further, a groove is disposed on the upper pressing block for limiting the upper tube clamp and the driving lever, and the upper tube clamp is limited in the groove.

Further, the upper tube clamp passes through the groove and is opposite to the lower tube clamp, and the upper tube clamp and the groove are in clearance fit, and the upper tube clamp slides along the groove.

Further, the driving lever is pivotally connected in the groove through a pivot, one end of the driving lever extends under a top platform of the upper tube clamp, and the driving lever guides and limits the upper tube clamp in a vertical direction.

Further, a return spring is included, the return spring is connected between the upper tube clamp and the top of the groove, and the return spring pushes back the upper tube clamp in the vertical direction.

Further, the driving lever includes two driving lever arms, and the driving lever arms move synchronously around a central pivot.

A pump head of peristaltic pump, includes a pump head body, and a path used to clamp a tube is provided in the pump head body, wherein: the upper pressing block is fitted to a reserved opening of the pump head body, and at least one fixed part and the corresponding toggle-type open-close clamping structural assembly are arranged on either side of the pump head, and the fixed part is located on the body.

Further, the pump head body has an opening for the driving lever to extend to a position below the fixed part.

Compared with the prior art, the present invention has the following beneficial effects:

A toggle block is fixed on the upper pressing block through a pin shaft and can rotate around the pin shaft. One end of the toggle block is used to lift the upper tube clamp, one end passes through the opening on the main body for the movement of the toggle block, and is abutted on a inclined plane of a top pressure toggle block of the body, and the inclined plane of the top pressure toggle block of the body is fixed. In the process that the toggle block is lifted with the upper pressing block, one end of the toggle block will rotate counterclockwise around the pin shaft under the action of the inclined plane, and the other end of the toggle block will toggle the upper tube clamp to move upward relative to the upper pressing block, thus increasing a relative displacement between the upper tube clamp and the lower tube clamp and a relative displacement between the upper tube clamp and the lower support, that is, increasing the operation space for installing the tube.

The driving lever structure is exquisite and compact, which is easy to be integrated in the pump head. During use, it can automatically fold, lift tube clamp with large displacement, and move coherently.

There are at least two sets of the toggle-type open-close clamping structural assemblies respectively arranged on both sides of the pump head, the mechanism is reasonably set up, and the force is relatively uniform.

The bottom surface of the fixed part is set as an inclined surface, and the inclined surface can match the sliding track in the sliding process of the driving lever to prevent the driving lever from wear and tear, and the mechanism is simple and exquisite, efficient and highly reliable.

REFERENCE NUMERAL DESCRIPTION

Figure 1:
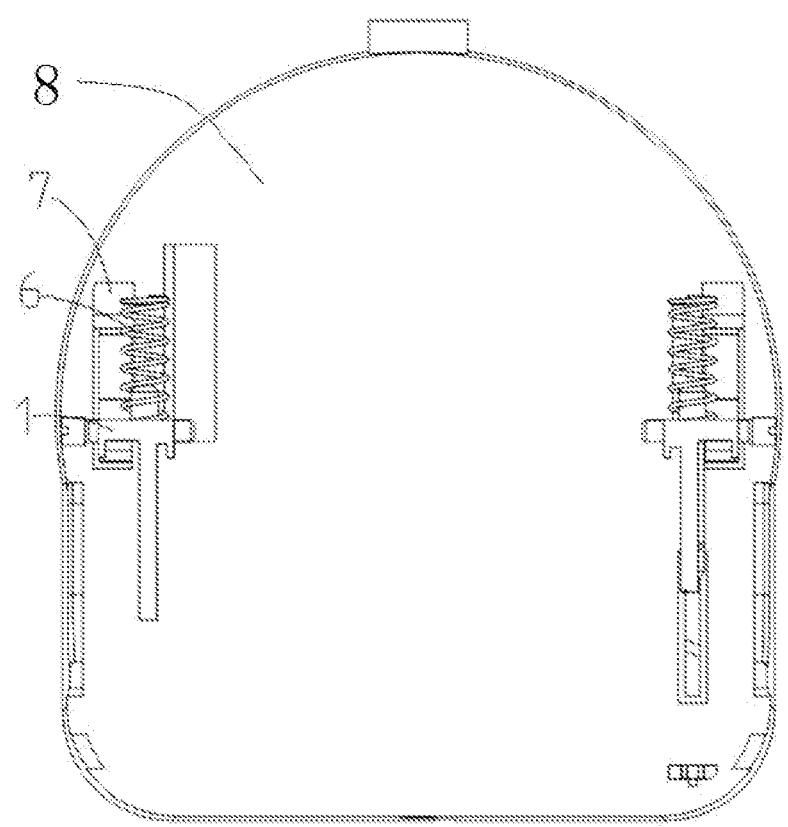
FIG. 1 is a side view of the structure of a toggle-type open-close clamp.

Upper tube clamp 1, Bending part 2, Groove 3, Driving lever 4, Fixed part 5, Return spring 6, Opening 7, Pump head body 8, Lower support 9.

DETAILED DESCRIPTION OF EMBODIMENTS

The present invention is further described below with reference to FIGS. 1-4:

Embodiment 1

As shown in FIG. 1, a toggle-type open-close clamping structural assembly is provided, which includes a lower tube clamp and an upper tube clamp 1 that are oppositely arranged and that are used to form a pair of collars for clamping a tube, an upper pressing block used for lifting and lowering, further includes a driving lever 4 used for enabling the upper tube clamp to lift or lower slidably with the upper pressing block, and the driving lever has two driving lever arms, an angle between the two driving lever arms is less than or equal to 180°.

The driving lever is pivotally connected to the upper pressing block, the upper tube clamp and one end of the driving lever are overlappingly disposed in a groove reserved on the upper pressing block, and the other end of the driving lever is abutted against a fixed part serving as fixing reference, the fixed part 5 is a fixed and protruding part for acting on the driving lever.

The fixed part slides along the upper pressing block, the upper pressing block slides vertically. A lower edge of the fixed part has a sliding surface for sliding of the driving lever, and in the lifting process of the upper pressing block, the other end of the driving lever slides along the sliding surface, and meanwhile the one end of the driving lever lifts the upper tube clamp. In a lifting or lowering process of the upper pressing block, the upper tube clamp is driven to lift or lower, and meanwhile, the driving lever rises together with the upper pressing block, to make the upper tube clamp far away from the lower tube clamp.

Figure 2:
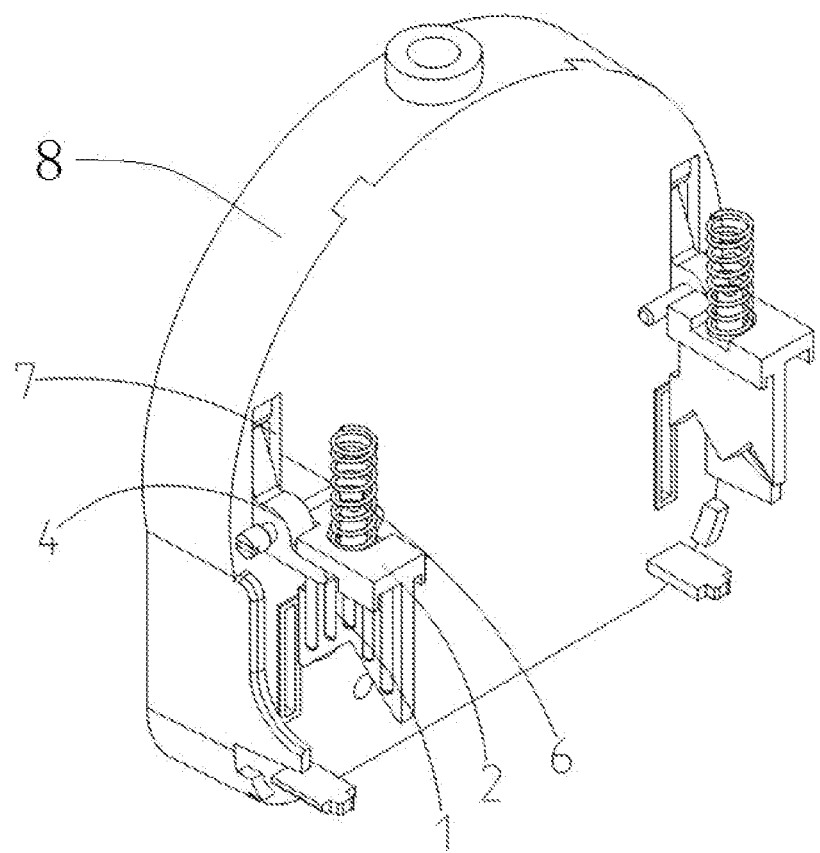
FIG. 2 is an axial view of the structure of a toggle-type open-close clamp.
Figure 3:
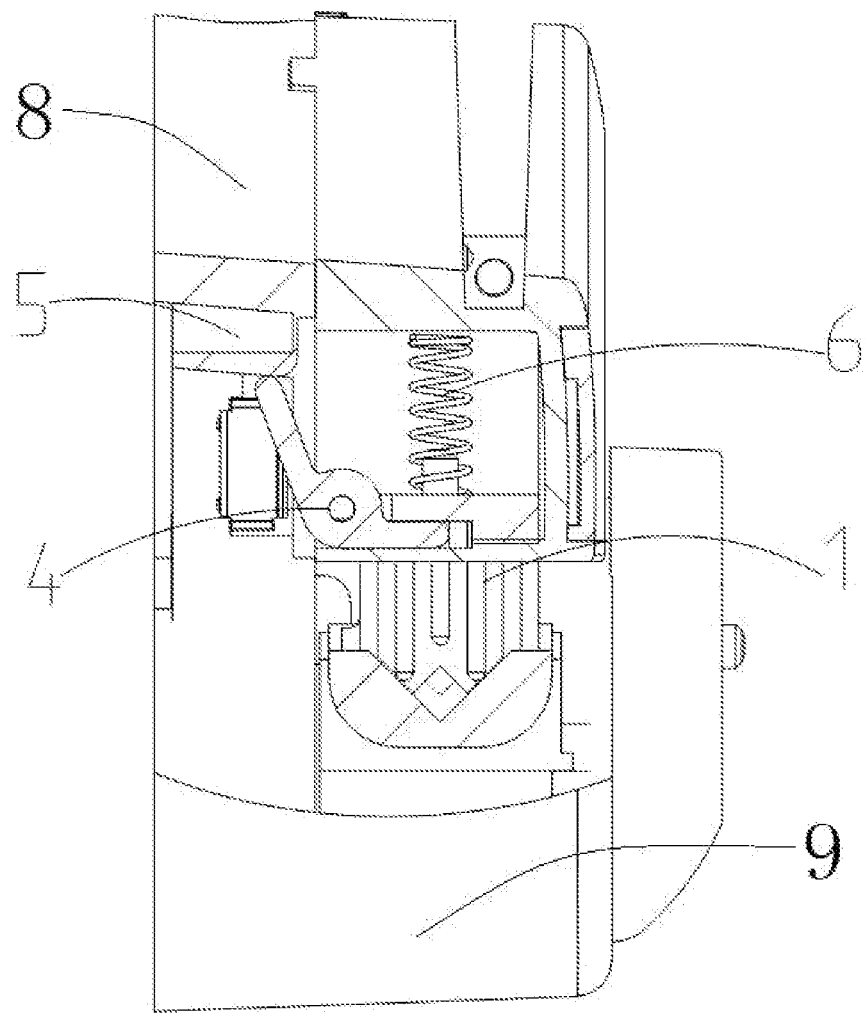
FIG. 3 is a closed state of the structure diagram of a pressing block of a peristaltic pump.
Figure 4:
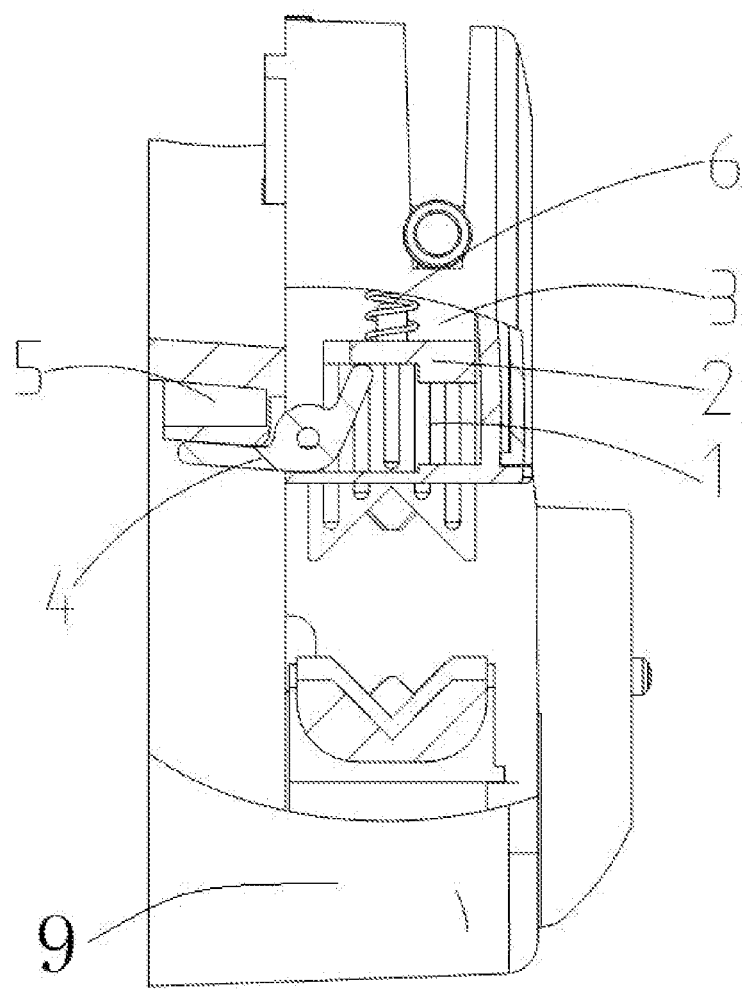
FIG. 4 is a lifting state of the structure diagram of a pressing block of a peristaltic pump.

As shown in FIG. 1 and FIG. 2, a groove is disposed on the upper pressing block for limiting the upper tube clamp and the driving lever, the top of the upper tube clamp moves to realize the pushing action, and a pushing structure realize the pushing action is limited in the groove 3. The pushing structure includes a bending part constructed at an upper part or the top of the upper tube clamp, and the bending part 2 is bent outward and interlocked in the groove 3. The upper tube clamp passes through the groove and is opposite to the lower tube clamp; the upper tube clamp and the groove are in clearance fit, and the upper tube clamp slides along the groove. The driving lever is pivotally connected to the upper pressing block in the groove through a pivot, one end of the driving lever extends into a reserved chute under the bending part, and the driving lever guides and limits the upper tube clamp in a vertical direction. A complementary staggered shape is formed outside the junction of the bending part and the driving lever, the bending part extends to a position between the pivot and an inner wall of the groove, and the upper tube clamp is limited between the driving lever and the inner wall of the groove.

In order to ensure excellent resilience, a return spring is also provided. The return spring is connected between the upper tube clamp and the top of the groove, and the return spring 6 pushes back the upper tube clamp in the vertical direction. The bottom surface of the fixed part is a slope whose gradient is consistent with that of an inclined plane formed by a path passed by the other end of the driving lever during the sliding process.

Embodiment 2, a pump head of peristaltic pump is provided, which includes the toggle-type open-close clamping structural assembly mentioned above, including a pump head body 8, and a path used to clamp a tube is provided in the pump head body 8. The tube path is a placement path with openings on both sides and passing through a central rolling section. The upper pressing block is fitted to a reserved opening of the pump head body 8, and the pump head body 8 has at least one fixed part or a fixed part is set on both sides of the pump head body 8. Each fixed part corresponds to a set of the toggle-type open-close clamping structural assembly, and the toggle-type open-close clamping structural assembly is correspondingly provided on either side of the pump head. The fixed part is located on the body, the pump head body 8 has an opening 7 for the driving lever to extend to a position below the fixed part, and a height of the opening 7 is consistent with the displacement of the driving lever arm in a vertical direction.

The invention claimed is:

1. A toggle-type open-close clamping structural assembly, comprising:
    a lower tube clamp and an upper tube clamp oppositely arranged to clamp a tube, and including an upper pressing block used for lifting and lowering, and further including a driving lever used for enabling the upper tube clamp to lift or lower slidably with the upper pressing block,
    the driving lever is pivotally connected to the upper pressing block, the upper tube clamp and one end of the driving lever are overlappingly disposed in a groove reserved on the upper pressing block, and the other end of the driving lever is abutted against a fixed part, the driving lever swings under an action of the fixed part to lift the upper tube clamp, and the height variation of the upper tube clamp is larger than that of the upper pressing block to generate a relative displacement between the upper tube clamp and the upper pressing block, wherein the fixed part is disposed on a pump head body, the pump head body slides along the upper pressing block, and a lower edge of the fixed part has a sliding surface for sliding of the driving lever, and in the lifting process of the upper pressing block, the other end of the driving lever slides along the sliding surface, and meanwhile the one end of the driving lever lifts the upper tube clamp.

2. The toggle-type open-close clamping structural assembly according to claim 1, wherein the upper tube clamp passes through the groove and is opposite to the lower tube clamp; the upper tube clamp and the groove are in clearance fit, and the upper tube clamp slides along the groove.

3. The toggle-type open-close clamping structural assembly according to claim 1, wherein the driving lever is pivotally connected to the upper pressing block in the groove through a pivot, one end of the driving lever extends to a position under a top platform of the upper tube clamp, and the driving lever guides and limits the upper tube clamp in a vertical direction.

4. The toggle-type open-close clamping structural assembly according to claim 1, further comprising a return spring, the return spring is connected between the upper tube clamp and the top of the groove, and the return spring pushes back the upper tube clamp in the vertical direction.

5. The toggle-type open-close clamping structural assembly according to claim 1, wherein the driving lever comprises two driving lever arms, and the driving lever arms move synchronously around a central pivot.

6. A pump head of a peristaltic pump, comprising the toggle-type open-close clamping structural assembly according to claim 1, further comprising the pump head body, and a path used to clamp the tube is provided in the pump head body, wherein:

a lower support and the upper pressing block are located on a same side of the pump head body to form a peristaltic cavity for placing the tube, the path passes through an outer edge of the peristaltic cavity, both ends of the path are provided with the fixed part and another toggle-type open-close clamping structural assembly according to claim 1.

7. The pump head of the peristaltic pump according to claim 6, wherein the upper tube clamp passes through the groove of the upper pressing block and is arranged opposite to the lower tube clamp to form the path to clamp the tube.

8. The pump head of the peristaltic pump according to claim 6, wherein the pump head body has an opening for the driving lever to extend a position below the fixed part.

9. A pump head of a peristaltic pump, comprising the toggle-type open-close clamping structural assembly according to claim 2, further comprising the pump head body, and a path used to clamp the tube is provided in the pump head body, wherein:

a lower support and the upper pressing block are located on a same side of the pump head body to form a peristaltic cavity for placing the tube, the path passes through an outer edge of the peristaltic cavity, both ends of the path are provided with the fixed part and another toggle-type open-close clamping structural assembly according to claim 1.

10. A pump head of a peristaltic pump, comprising the toggle-type open-close clamping structural assembly according to claim 3, further comprising the pump head body, and a path used to clamp the tube is provided in the pump head body, wherein:

a lower support and the upper pressing block are located on a same side of the pump head body to form a peristaltic cavity for placing the tube, the path passes through an outer edge of the peristaltic cavity, both ends of the path are provided with the fixed part and another toggle-type open-close clamping structural assembly according to claim 1.

11. A pump head of a peristaltic pump, comprising the toggle-type open-close clamping structural assembly according to claim 4, further comprising the pump head body, and a path used to clamp the tube is provided in the pump head body, wherein:

a lower support and the upper pressing block are located on a same side of the pump head body to form a peristaltic cavity for placing the tube, the path passes through an outer edge of the peristaltic cavity, both ends of the path are provided with the fixed part and another toggle-type open-close clamping structural assembly according to claim 1.

12. A pump head of a peristaltic pump, comprising the toggle-type open-close clamping structural assembly according to claim 5, further comprising the pump head body, and a path used to clamp the tube is provided in the pump head body, wherein:

a lower support and the upper pressing block are located on a same side of the pump head body to form a peristaltic cavity for placing the tube, the path passes through an outer edge of the peristaltic cavity, both ends of the path are provided with the fixed part and another toggle-type open-close clamping structural assembly according to claim 1.

* * * * *